(12) United States Patent
Spatafora et al.

(10) Patent No.: US 7,048,492 B2
(45) Date of Patent: May 23, 2006

(54) METHOD AND DEVICE FOR PICKING UP STACKS OF BLANKS

(75) Inventors: Mario Spatafora, Bologna (IT); Alberto Stagni, S. Pietro in Casale (IT)

(73) Assignee: G.D Societa' Per Azioni, Bologna (IT)

( * ) Notice: Subject to any disclaimer, the term of this patent is extended or adjusted under 35 U.S.C. 154(b) by 251 days.

(21) Appl. No.: 10/421,854

(22) Filed: Apr. 24, 2003

(65) Prior Publication Data

US 2004/0028519 A1 Feb. 12, 2004

(30) Foreign Application Priority Data

May 6, 2002 (IT) .......................... B02002A0260

(51) Int. Cl.
*B65H 3/50* (2006.01)
(52) U.S. Cl. ................ 414/796.9; 414/796; 414/795.9; 414/796.6
(58) Field of Classification Search ............. 414/795.9, 414/796, 280, 661, 814
See application file for complete search history.

(56) References Cited

U.S. PATENT DOCUMENTS

| | | | | |
|---|---|---|---|---|
| 3,850,116 A | * | 11/1974 | Mackes | 414/661 |
| 4,159,887 A | * | 7/1979 | Dick | 414/796 |
| 4,526,504 A | * | 7/1985 | Hovey | 414/661 |
| 4,877,367 A | * | 10/1989 | Cinotti | 414/796 |
| 5,169,284 A | | 12/1992 | Berger et al. | |
| 5,380,147 A | * | 1/1995 | Hess et al. | 414/796 |
| 6,059,514 A | * | 5/2000 | Sanchez | 414/661 |
| 6,332,750 B1 | | 12/2001 | Donner et al. | |

FOREIGN PATENT DOCUMENTS

| | | |
|---|---|---|
| EP | 0562432 | 9/1993 |
| JP | 57160827 | 10/1982 |
| WO | WO 01/96221 A1 | 12/2001 |

OTHER PUBLICATIONS

Search Report

* cited by examiner

*Primary Examiner*—Khoi H. Tran
(74) *Attorney, Agent, or Firm*—Harness, Dickey & Pierce, P.L.C.

(57) ABSTRACT

A method and device for picking up stacks of blanks, arranged in at least one layer on a separating sheet having a peripheral portion projecting outwards of the layer; the stacks are removed successively by a pickup member, a free end of which is pressed onto the separating sheet in a position facing a stack for removal, and is then slid in a given pickup direction, and in contact with the separating sheet, beneath the stack for removal. A portion, crosswise to the pickup direction and facing the pickup member, of the peripheral portion of the separating sheet is blocked in position both crosswise to its plane and in the pickup direction by a gripping device before and during removal of the stacks.

24 Claims, 4 Drawing Sheets

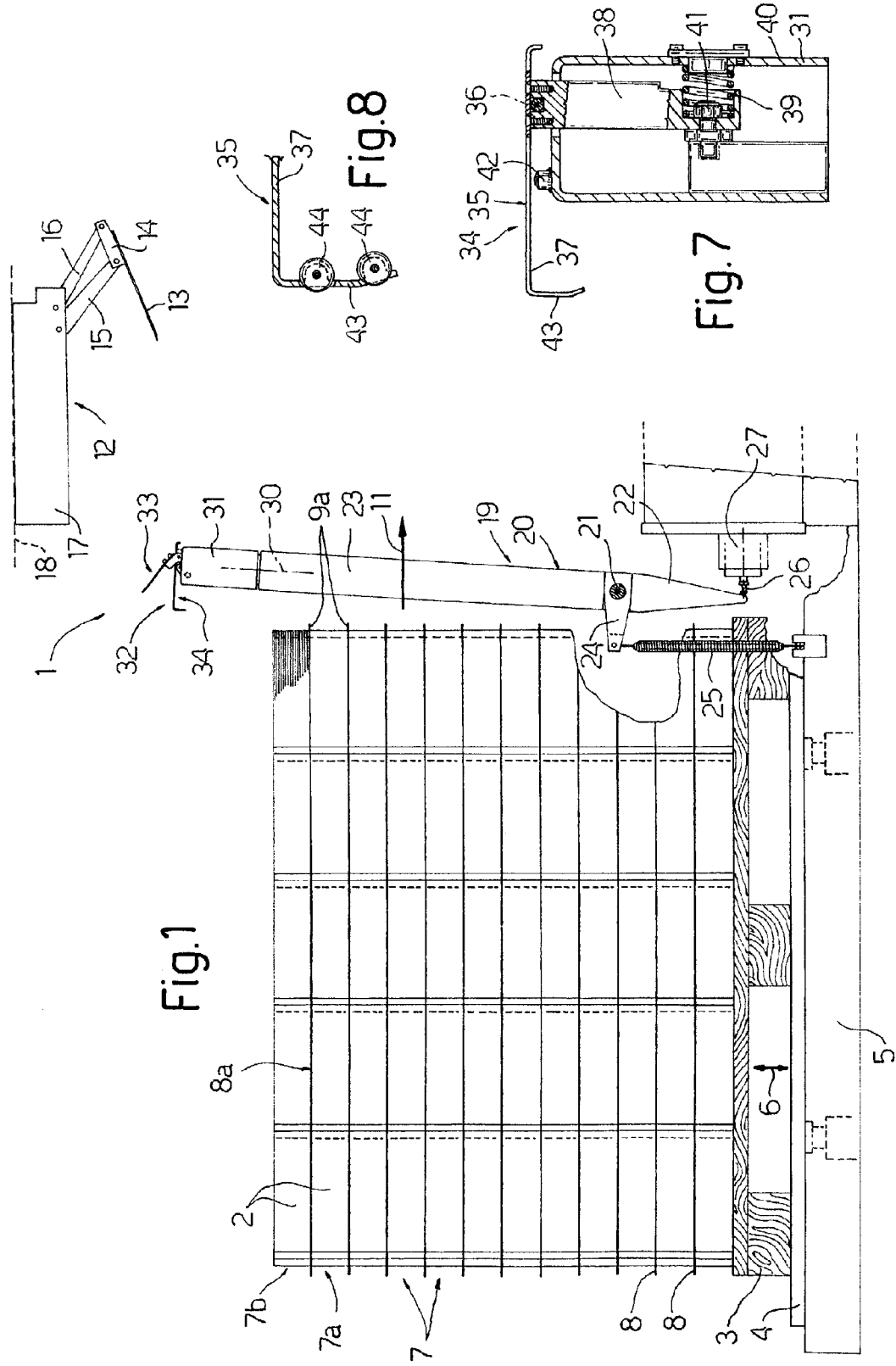

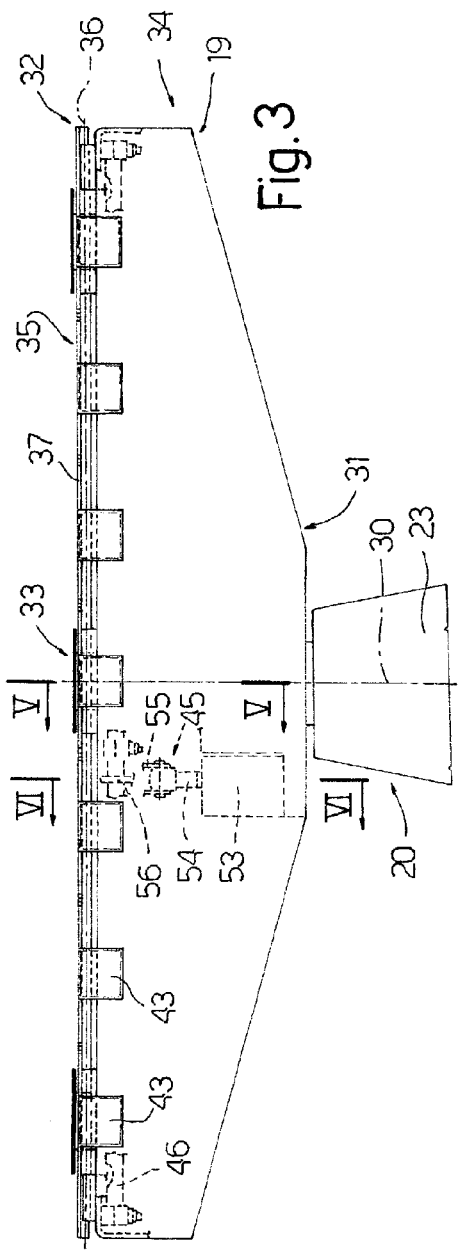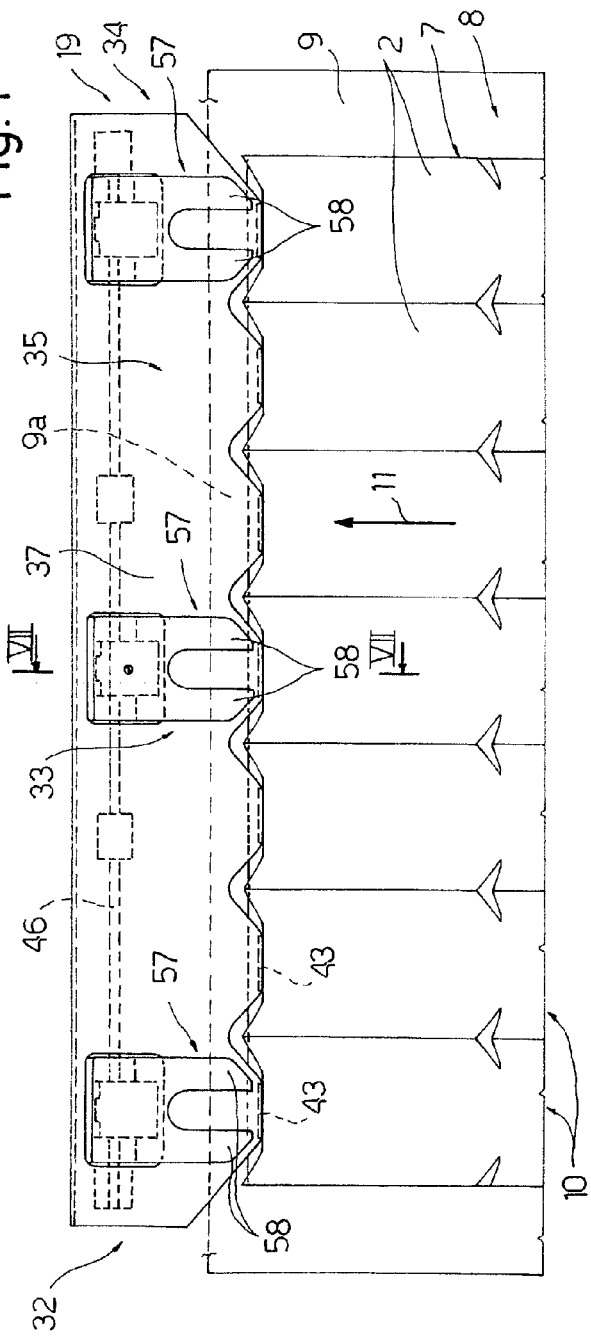

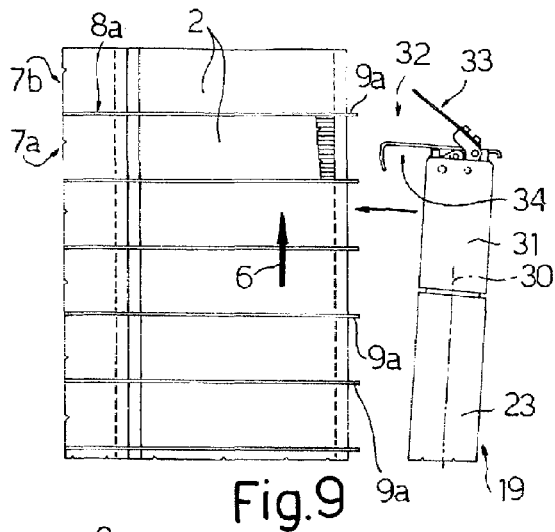
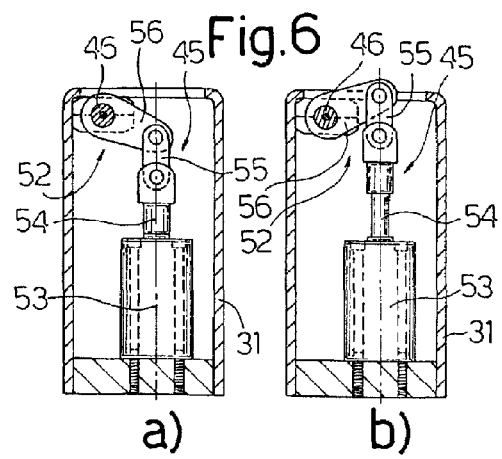
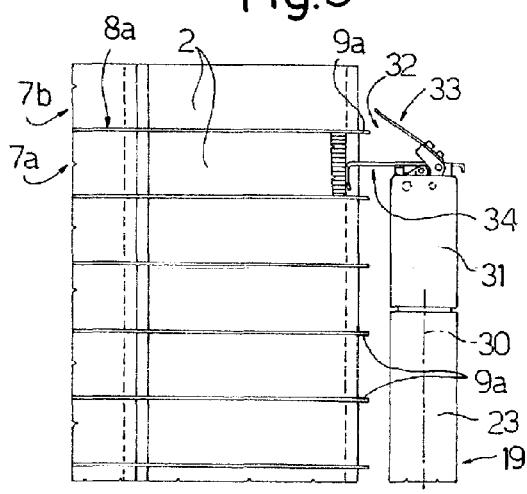
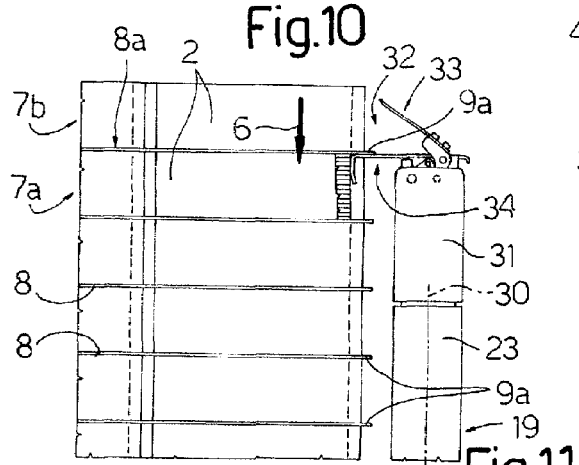
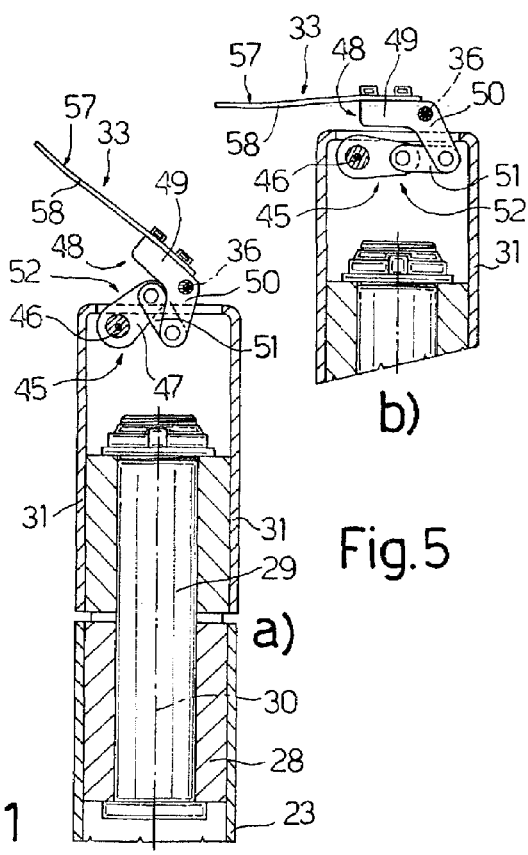

METHOD AND DEVICE FOR PICKING UP STACKS OF BLANKS

The present invention relates to a method of picking up stacks of blanks.

More specifically, the present invention relates to a method of picking up stacks of blanks to transfer, one at a time, a given number of stacks stacked on a pallet to a cigarette packing machine, to which the following description refers purely by way of example.

BACKGROUND OF THE INVENTION

In the tobacco industry, a number of stacks of blanks are arranged on a pallet in a number of superimposed layers, each of which is separated from each adjacent layer by a separating member, normally a sheet of cardboard or similar, and the stacks in each layer are picked up successively by a pickup member comprising an articulated fork, a free end of which is pressed down, facing the stack to be picked up, on the underlying separating member to deform the separating member slightly downwards. The free end of the fork, still pressing down on the separating member, is then fed towards the stack to be picked up, so as to insert the fork underneath the stack. In the course of the above operations, the fork is rotated, about an axis parallel to the plane of the separating member, between an initial-contact position in which the fork slopes downwards towards the separating member, and a pickup position in which the fork is substantially parallel to the separating member.

The above pickup method is normally efficient and accurate, and only poses problems when the speed of the fork exceeds a given threshold, over and above which the fork tends to crumple and/or pierce the separating member.

SUMMARY OF THE INVENTION

It is an object of the present invention to perfect the above method by providing a method of picking up blanks, designed to eliminate the aforementioned drawback.

BRIEF DESCRIPTION OF THE DRAWINGS

A non-limiting embodiment of the present invention will be described by way of example with reference to the accompanying drawings, in which:

FIG. 1 shows a schematic side view of a preferred embodiment of the pickup device according to the present invention;

FIGS. 3 and 4 show larger-scale rear and plan views respectively of a second detail in FIG. 1;

FIG. 5 shows a section along line V—V in FIG. 3 of the FIG. 3 detail in two distinct operating configurations;

FIG. 6 shows a section along line VI—VI in FIG. 3 of the FIG. 3 detail in two distinct operating configurations;

FIG. 7 shows a section along line VII—VII in FIG. 4;

FIG. 8 shows a larger-scale view of a variation of a detail in FIG. 7;

FIGS. 9 to 13 show schematic views, with parts removed for clarity, of the FIG. 1 device in a succession of operating positions.

DETAILED DESCRIPTION OF THE INVENTION

Figure 12:
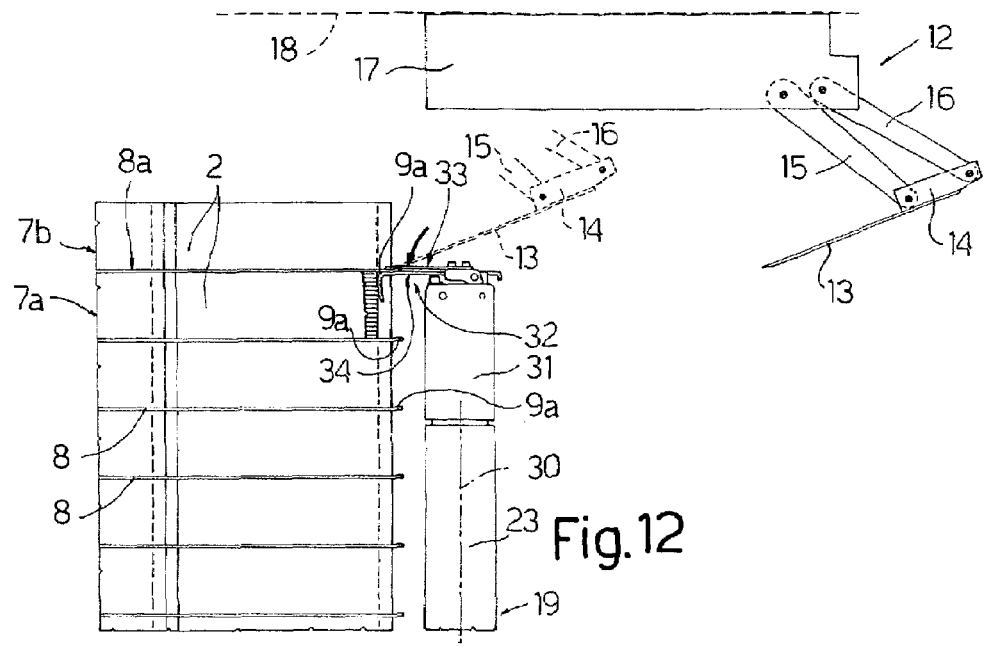

Number 1 in FIG. 1 indicates as a whole a pickup device for successively picking up stacks 2 of blanks off a pallet 3 resting on a substantially horizontal platform 4, which is supported on a base frame 5 and is movable, with respect to frame 5, in a substantially vertical direction 6. Stacks 2 are arranged on pallet 3 in a number of superimposed layers 7, each of which is separated from the underlying layer 7 by a separating sheet 8 normally made of cardboard or similar, and a peripheral portion 9 (FIG. 4) of which projects outwards of the periphery of layers 7. As shown more clearly in FIGS. 1 and 4, in each layer 7, stacks 2 are arranged in a number of parallel rows 10 in a direction 11.

With reference to FIG. 1, pickup device 1 comprises a pickup assembly 12 facing a portion 9a, crosswise to direction 11, of peripheral portion 9 of each separating sheet 8. Pickup assembly 12 comprises an articulated fork 13 which projects, in direction 11 and by a length similar to the length of a stack 2 in direction 11, from one end of a connecting rod 14, which is movable in a plane parallel to direction 11, and the opposite ends of which are hinged to two cranks 15 and 16 in turn hinged to a carriage 17 powered to run, under the control of a logic unit not shown, along an overhead rail 18 parallel to direction 11. Carriage 17 houses a known drive unit (not shown) which, under the control of said logic unit (not shown), operates cranks 15 and 16 independently to move articulated fork 13 and possibly also adjust its tilt with respect to a horizontal plane.

Pickup device 1 also comprises a stabilizing device 19 for keeping each separating sheet 8 taut and substantially undeformed when, as explained in detail later on, separating sheet 8 is engaged by fork 13 of pickup assembly 12.

With reference to FIG. 1, stabilizing device 19 comprises a rocker arm 20 positioned substantially vertically between pickup assembly 12 and platform 4, and pivoting on a horizontal pin 21, which is perpendicular to direction 11 and supported in a fixed position on frame 5. Rocker arm 20 comprises a bottom arm 22 and a top arm 23, and is fitted, between arms 22 and 23, with a bracket 24 projecting towards platform 4 from rocker arm 20 and connected at the free end to the end of a spring 25 extending downwards and stretched between bracket 24 and a point on frame 5, so as to normally push top arm 23 towards platform 4, and in particular towards a pallet 3 resting on platform 4. The bottom end of bottom arm 22 is positioned laterally contacting the free end of an output rod 26 of a linear actuator 27, which is supported by frame 5 in a horizontal position parallel to direction 11 and on the opposite side of bottom arm 22 to platform 4.

As shown more clearly in FIG. 5a, top arm 23 is closed at the top end by a plug 28, through which a pin 29, having an axis 30 of rotation coaxial with top arm 23, is fitted in rotary and axially fixed manner and connects top arm 23 in axially fixed manner to a head 31 rotating idly about axis 30. Head 31 supports at the top end (FIG. 1) supporting and clamping means 32 defined by a gripping device 32, which comprises a movable top jaw 33, and a feeler 34 defining a substantially fixed bottom jaw of gripping device 32.

As shown more clearly in FIGS. 3, 4 and 7, feeler 34 comprises a supporting member defined by an L-shaped apron 35 fitted to the top of head 31 to oscillate, with respect to head 31, about a substantially horizontal axis 36 crosswise to both axis 30 and direction 11. More specifically, apron 35 comprises a plate 37 substantially perpendicular to axis 30, at least as wide as pallet 3, and for supporting portion 9a of peripheral portion 9 of a separating sheet 8. On the underside surface facing the top of head 31, plate 37 is fitted with an arm 38, which is perpendicular to plate 37, is traversed by axis 36, and penetrates inside head 31 so that a bottom-end portion contacts a substantially horizontal spring 39 crosswise to axis 30 and tensioned between arm 38 and a lateral wall 40 of head 31. Spring 39 controls the movement of platform 4 in direction 6 and pushes arm 38 towards platform 4 and against both a stop sensor 41, which detects the movements of arm 38 in opposition to spring 39, and a stop 42 on top of head 31. Apron 35 also comprises a number of teeth 43 extending downwards from plate 37 and equally spaced along an edge of plate 37 facing platform 4.

In the FIG. 8 embodiment, each tooth 43 has contact rollers 44 mounted for rotation about respective axes parallel to axis 36.

Top jaw 33 of gripping device 32 comprises an actuating device 45, in turn comprising a shaft 46 parallel to axis 36 and mounted for rotation through head 31; a number of cranks 47 (only one shown) fitted to shaft 46; and a number of rocker arms 48 (only one shown) pivoting about axis 36. Each rocker arm 48 comprises an arm 49 facing platform 4; and an arm 50 hinged to a respective connecting rod 51, the small end of which is connected in rotary manner to the free end of a respective crank 47. Members 46–51 define a transmission 52 controlled by a piston 53, which is parallel to top arm 23 of rocker arm 20, is supported by rocker arm 20, and has an output rod 54 connected by a connecting rod 55 to the end of a further crank 56 fitted to shaft 46.

Top jaw 33 also comprises a number of fork members 57, each of which is connected to arm 49 of a respective rocker arm 48, is substantially U-shaped, and in turn comprises two arms 58 facing platform 4, extending over plate 37, and separated by a distance greater than the width of fork 13.

In actual use, once pallet 3 is placed on platform 4 maintained in the lowered position shown in FIG. 1, platform 4 is raised in direction 6 to position the second layer 7 from the top—indicated 7a—facing feeler device 34 (FIG. 9). More specifically, platform 4 is raised until the separating sheet 8—indicated 8a—interposed between layer 7a and the top layer 7—indicated 7b—is positioned just slightly higher than plate 37, the teeth 43 of which are kept detached from the lateral surface of the facing layer 7a by output rod 26 of linear actuator 27 acting on bottom arm 22 of rocker arm 20 in opposition to spring 25.

Rod 26 is then withdrawn (FIG. 10) so that teeth 43 of feeler device 34 contact the facing lateral surface of layer 7a. In this connection, it should be pointed out that any lack of parallelism between the lateral surface of layer 7a and the surface of teeth 43 is compensated for by head 31 rotating about axis 30.

All the above operations are performed with gripping device 32 in the open position.

Platform 4 is then lowered (FIG. 11) so that plate 37 contacts the underside surface of portion 9a of peripheral portion 9 of the separating sheet 8 interposed between layers 7a and 7b and marked 8a. Which contact rotates the whole of apron 35 slightly about axis 36 and in opposition to spring 39, so that plate 37 contacts stop 42 and activates sensor 41, which stops platform 4 in the operating position shown in FIG. 11, in which portion 9a of peripheral portion 9 of separating sheet 8a facing fork 13 rests on a portion of plate 37 adjacent to teeth 43 and facing platform 4. At this point (FIG. 12), top jaw 33 of gripping device 32 is moved towards plate 37 into the closed position to grip peripheral portion 9 of separating sheet 8a and keep it taut and firmly in position when fork 13 is lowered to successively remove stacks 2 in layer 7b.

More specifically, and as shown by the dash line in FIG. 12, fork 13 contacts portion 9a of peripheral portion 9 of separating sheet 8a on plate 37—which strengthens and so prevents tearing of separating sheet 8a—and then slides smoothly, with no creasing, over separating sheet 8a towards the selected stack 2 in layer 7b, by virtue of sheet 8a being kept taut by gripping device 32.

To pick up a stack 2 positioned facing a fork member 57, separator sheet 8 is still engaged correctly by fork 13, by arms 58 of fork member 57 being spaced sufficiently far apart to permit insertion of fork 13.

Figure 13:
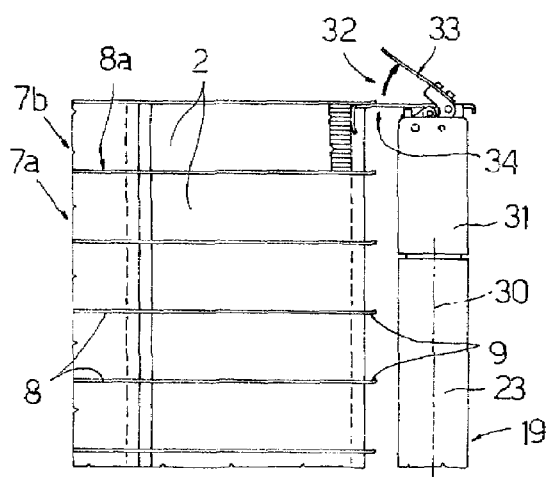
Figure 2:
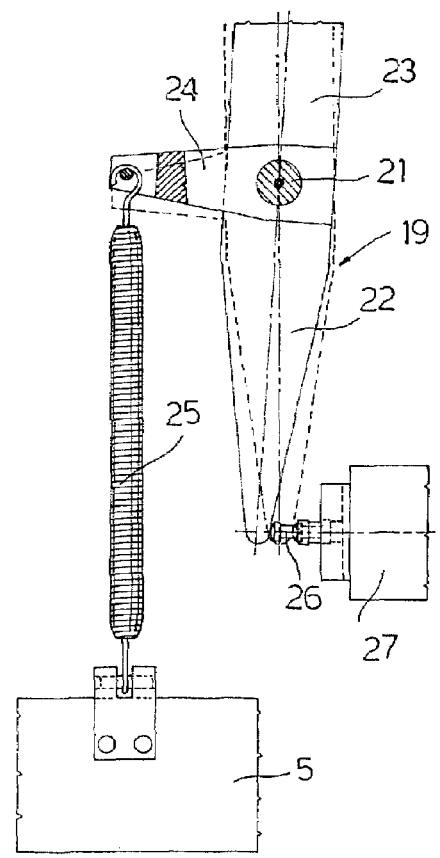
FIG. 2 shows a larger-scale view of a first detail in FIG. 1.

Once all the stacks 2 in layer 7b have been removed, gripping device 32 is opened (FIG. 13) and withdrawn from layer 7a; separating sheet 8a is removed in known manner by a pickup device not shown; and all the above operations are repeated for one layer 7 at a time until all of stacks 2 are removed.

In a variation not shown but easily deducible from the drawings and the above description, top jaw 33 of supporting and clamping means 32 is dispensed with, and bottom jaw 34 is replaced by a supporting member 34 for supporting peripheral portion 9a. The top surface of supporting member 34 has a number of suction holes for supporting and retaining peripheral portion 9a from underneath, and the suction holes are connected to appropriate known suction means.

What is claimed is:

1. A method of picking up stacks of blanks, said stacks being arranged in at least one layer on a separating sheet which has a peripheral portion projecting outwards of the periphery of the layer of stacks; the method comprising
    a pickup step wherein said stacks are picked up successively by a pickup member, which is pressed onto said separating sheet in a position facing a said stack for removal, and is then slid in a given pickup direction, and in contact with said separating sheet, beneath said stack for removing only the stack without the separating sheet; and
    a supporting and blocking step wherein said separating sheet is stiffened both crosswise to its plane and in said pickup direction while the pickup member is inserted between the stack and the separating sheet; wherein during said supporting and blocking step and while the pickup member is inserted between the stack and the separating sheet, said peripheral portion of the separating sheet is supported and retained from underneath by a bottom supporting member.

2. A method as claimed in claim 1, wherein said supporting and blocking step commences prior to performance of said pickup step, and continues throughout performance of said pickup step.

3. A method as claimed in claim 1, wherein said separating sheet includes a peripheral portion projecting outwards of said layer at least towards said pickup member and crosswise to said pickup direction; said supporting and blocking step including blocking said peripheral portion in position both in a vertical direction and in said pickup direction.

4. A method as claimed in claim 3, wherein, during said supporting and blocking step, said peripheral portion is gripped by a gripping device including the bottom supporting member for supporting said peripheral portion, and a top jaw movable, with respect to said bottom supporting member, between an open position and a blocking position blocking said peripheral portion against the bottom supporting member.

5. A method as claimed in claim 4, wherein said supporting and blocking step includes the substeps of positioning said gripping device, in the open position, alongside said layer and facing said peripheral portion; moving said layer and the relative said separating sheet to a level higher than said bottom supporting member; moving said gripping device towards said peripheral portion to position said bottom supporting member directly beneath the peripheral portion; moving said layer and the relative separating sheet so that said peripheral portion contacts said bottom supporting member; and moving said top jaw into said blocking position.

6. A method as claimed in claim 3, wherein, during said supporting and blocking step, said peripheral portion is supported and retained from underneath by suction by supporting and blocking element including a supporting member for supporting said peripheral portion; said supporting member having a top surface for supporting and blocking said peripheral portion from underneath.

7. A device for picking up stacks of blanks arranged in at least one layer on a separating sheet which has a peripheral portion projecting outwards of the periphery of the aver of stacks, the device comprising
a pickup member movable to and from said layer;
an actuating device for moving said pickup member onto said separating sheet in a position facing a said stack for removal, and for sliding the pickup member in a given pickup direction, and in contact with said separating sheet, beneath said stack for removing only the stack without the separating sheet; and
supporting and blocking element for stiffening said separating sheet both crosswise to its plane and in said pickup direction while the pickup member is inserted between the stack and the separating sheet; wherein said supporting and blocking element comprises a bottom supporting member to support and retain from underneath said peripheral portion of the separating sheet while the pickup member is inserted between the stack and the separating sheet.

8. A device as claimed in claim 7, wherein said separating sheet includes a peripheral portion projecting outwards of said layer at least towards said pickup member and crosswise to said pickup direction; said supporting and blocking element including a gripping device, in turn including the bottom supporting member for supporting said peripheral portion, and a top jaw movable, with respect to said bottom supporting member, between an open position and a blocking position blocking said peripheral portion against the bottom supporting member.

9. A device as claimed in claim 8, and also including supporting element for supporting said gripping device; first actuating device for imparting to said layer a first movement in a vertical direction in respect to said gripping device; second actuating device for imparting to said layer and to said gripping device a second relative, lateral approach and parting, movement substantially crosswise to said first relative movement; and third actuating device for moving said top jaw between said open position and said blocking position.

10. A device as claimed in claim 9, wherein said first actuating device support said layer.

11. A device as claimed in claim 9, wherein said first actuating device includes a platform movable vertically and supporting said layer and said separating sheet.

12. A device as claimed in claim 11, wherein said supporting element is located alongside said first actuating device and between said first actuating device and said pickup member, and includes a rocker arm positioned substantially vertically to oscillate about a substantially horizontal first axis, said rocker arm including a top arm and a bottom arm; and a head fitted to said top arm and supporting said gripping device.

13. A device as claimed in claim 12, wherein said head is connected to said top arm to rotate idly, with respect to said top arm, about a second axis crosswise to said first axis.

14. A device as claimed in claim 12, wherein said second actuating device is connected to said bottom arm and activated to withdraw said gripping device from said layer in opposition to elastic element.

15. A device as claimed in claim 9, wherein said bottom supporting member of said gripping device includes feeler element for controlling the position of said gripping device with respect to said peripheral portion of said separating sheet; said feeler element controlling said first actuating means.

16. A device as claimed in claim 8, wherein said top jaw includes at least one fork member facing in said pickup direction and including two arms spaced sufficiently far apart to permit passage, between the two arms, of said pickup member.

17. A device for picking up stacks of blanks arranged in at least one layer on a separating sheet, the device comprising
a pickup member movable to and from said layer; including a peripheral portion projecting outwards of said layer at least towards said pickup member and crosswise to said pickup direction
actuating means for moving said pickup member onto said separating sheet in a position facing a said stack for removal, and for sliding the pickup member in a given pickup direction, and in contact with said separating sheet, beneath said stack for removal; and
supporting and blocking element for stiffening said separating sheet both crosswise to its plane and in said pickup direction;
wherein said separating sheet; said supporting and blocking means including a gripping device, in turn including the bottom supporting member for supporting said peripheral portion, and a top jaw movable, with respect to said bottom supporting member, between an open position and a blocking position blocking said peripheral portion against the bottom supporting member;
wherein said top jaw comprises at least one fork member facing in said pickup direction and including two arms spaced sufficiently far apart to permit passage, between the two arms, of said pickup member.

18. A device as claimed in claim 17, and also including supporting element for supporting said gripping device; first actuating device for imparting to said layer a first movement in a vertical direction in respect to said gripping device; second actuating device for imparting to said layer and to said gripping device a second relative, lateral approach and parting, movement substantially crosswise to said first relative movement; and third actuating device for moving said top jaw between said open position and said blocking position.

19. A device as claimed in claim 18, wherein said first actuating device support said layer.

20. A device as claimed in claim 18, wherein said first actuating device comprise a platform movable vertically and supporting said layer and said separating sheet.

21. A device as claimed in claim 19, wherein said supporting element is located alongside said first actuating device and between said first actuating device and said pickup member, and includes a rocker arm positioned substantially vertically to oscillate about a substantially horizontal first axis, said rocker arm including a top arm and a bottom arm; and a head fitted to said top arm and supporting said gripping device.

22. A device as claimed in claim 21, wherein said head is connected to said top arm to rotate idly, with respect to said top arm, about a second axis crosswise to said first axis.

23. A device as claimed in claim 21, wherein said second actuating device are connected to said bottom arm and activated to withdraw said gripping device from said layer in opposition to elastic element.

24. A device as claimed in claim 18, wherein said bottom supporting member of said gripping device comprises feeler element for controlling the position of said gripping device with respect to said peripheral portion of said separating sheet; said feeler element controlling said first actuating device.

* * * * *